United States Patent [19]
Campbell et al.

[11] Patent Number: 5,305,629
[45] Date of Patent: Apr. 26, 1994

[54] REGULATED NEGATIVE CALIBRATION PULSE GENERATOR

[75] Inventors: James A. Campbell, Ann Arbor; James R. Paye, Southfield; Kenneth M. Klemczak, Novi, all of Mich.

[73] Assignee: Automotive Systems Laboratory, Inc., Farmington Hills, Mich.

[21] Appl. No.: 972,566

[22] Filed: Nov. 6, 1992

[51] Int. Cl.⁵ .............................................. G01P 21/00
[52] U.S. Cl. ...................................................... 73/1 D
[58] Field of Search .................. 73/1 D, 2, 517 R, 1 B

[56] References Cited
U.S. PATENT DOCUMENTS 5,060,504  10/1991  White et al. ........................... 73/1 D
5,103,667  4/1992  Allen et al. ............................. 73/1 D Primary Examiner—Robert Traevis
Attorney, Agent, or Firm—Lyman R. Lyon

[57] ABSTRACT

A circuit for generating a regulated negative voltage output pulse for use in calibrating a transducer, such as used in sensing an acceleration profile of a moving object, comprises a transistor responsive to a periodically generated control pulse for reversing the polarity charge on a capacitor. A negative voltage charge on the capacitor activates a negative voltage regulator to generate the desired regulated negative voltage calibration pulse. A pair of resistors are series connected to the regulated negative voltage output and a positive voltage reference source to provide an output for an external monitoring device to verify the generation of an accurate regulated negative voltage calibration pulse. The pair of resistors also provide a bypass of the negative voltage regulator when no external control pulse is present, thereby establishing a positive voltage output for the calibration pulse generating circuit when a regulated negative voltage calibration pulse is not being generated. The present invention is able to use a positive voltage power supply, or battery, to generate the desired regulated negative voltage calibration pulse output.

9 Claims, 1 Drawing Sheet

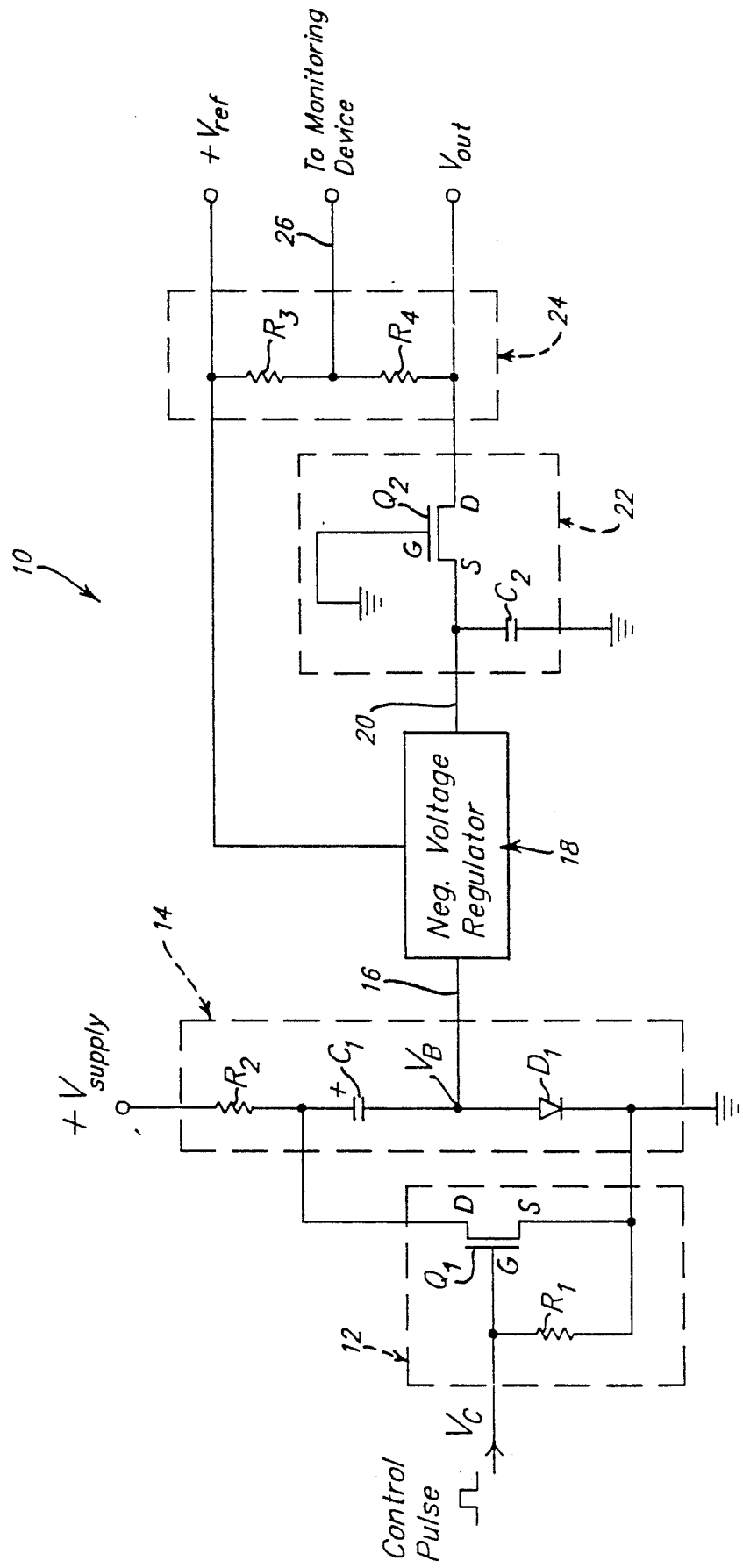

5,305,629

REGULATED NEGATIVE CALIBRATION PULSE GENERATOR

BACKGROUND OF THE INVENTION

The present invention is generally related to systems for calibrating transducers, and more particularly to circuits for producing negative voltage pulses used to generate electrostatic calibration forces for transducers used in sensing the acceleration profile of a moving object, such as a motor vehicle.

The prior art teaches transducers, or sensors, having a rigid frame and a sensing mass cantilevered on a support beam which is displaced generally normal to the direction of beam extension upon acceleration of an accelerating force to the frame. A plurality of strain gages bonded to the beam or diffused into the surface thereof are connected to a Wheatstone bridge in a manner familiar to those skilled in the art, whereby an output proportional to the amount of such sensing mass displacement is obtained. The Wheatstone bridge is typically referenced to a small positive excitation voltage, such as 5 volts, to accommodate natural sensing mass offset not caused by an accelerating force. Unfortunately, the output from the strain gages is adversely affected by creep and hysteresis losses. Moreover, the resistance of the strain gages and, hence, the output of the Wheatstone bridge connected thereto vary greatly with temperature. The variation in bridge output due to temperature is further complicated, for example, where the sensing mass and its supporting beam are micromachined from silicon, as the relationship between the acceleration-induced deflection of the sensing mass and temperature is unknown. Still further, such sensors are typically manufactured at high temperatures and subsequently cooled, whereby a thermal prestress is generated therein which is released or otherwise manifests itself as the operating temperature of the sensor varies. As a result, the sensor must be recalibrated on a continuing basis.

In the past, calibration of the sensor was achieved by periodically generating a predetermined, positive value, electrostatic displacement voltage. The displacement voltage is typically placed on the sensor beam in order to induce a particular electrostatic displacement field on the sensing mass. The particular electrostatic displacement field simulates the deflection effect on the sensing mass equivalent to application of a predetermined acceleration force to the sensor frame. The instantaneous change in the bridge output is then calibrated in terms of the simulated, predetermined acceleration value. Such calibration ensures that the sensor output accurately reflects true acceleration profiles of the moving object.

Typical prior art sensors, which are capable of output calibration, generally have been provided with electrical input leads on the sensor bridge to accommodate the above described positive value, electrostatic displacement voltage. However, in particular situations, such electrical input leads are susceptible to errant electrostatic voltages, such as static electricity discharged from a technician handling the sensor, thereby causing uncontrolled displacement of the sensing mass. In order to prevent this type of uncontrolled sensing mass displacement and possible attendant damage to the sensor, circuitry has been connected to the electrical input leads which reduces or eliminates any sensitivity of the sensor bridge to errant electrostatic voltages placed on the electrical input leads.

However, such circuitry is problematic for achieving sensor output calibration because the circuitry is typically realized as a diode arrangement which prevents any positive value electrostatic displacement voltages greater than the reference excitation voltage from deflecting the sensing mass. Accordingly, negative value electrostatic displacement voltages must be used to calibrate the sensor output as described hereinabove. Prior art negative voltage calibration pulse generating circuits have not presented a satisfactory solution due to the drawbacks of requiring a dedicated negative voltage power supply, and/or providing unregulated negative voltage outputs which can compromise accuracy in calibration of the sensor, or potentially damage the sensor due to the generation of excessive voltage spikes.

SUMMARY OF THE INVENTION

It is therefore an object of the present invention to provide a negative voltage pulse generating circuit which utilizes a positive voltage power supply.

It is also an object of the present invention to provide a negative voltage pulse generating circuit which utilizes a positive voltage power supply to generate a regulated negative voltage output.

It is further an object of the present invention to provide a negative voltage pulse generating circuit which outputs a regulated negative value displacement voltage used for calibrating the output of a sensor, such as an accelerometer, wherein the generation of a regulated negative value displacement voltage is verified with a positive voltage monitoring means.

In accordance with the present invention, a circuit for generating a regulated negative voltage for use in calibrating the output of a transducer comprises an input switch means responsive to an externally generated control signal for generating an activation potential, and a voltage conditioning means connected to a first positive voltage source and to an input switch means. The voltage conditioning means generates a negative voltage output in response to generation of the activation potential, and a positive voltage output in the absence of the activation potential. A negative voltage regulator, connected to the voltage conditioning means and responsive to the negative voltage generated thereby, generates a regulated negative voltage output having a predetermined magnitude. An output switch means is responsive to the regulated negative voltage output for outputing the regulated negative voltage output as a calibration signal to the transducer.

In further accordance with the present invention, the circuit for generating a regulated negative voltage output also comprises a bypass means connected to a second positive voltage source and the output switch means for outputing a first positive voltage to the transducer when the regulated negative voltage output is not generated. The bypass means further generates a second output for use by an externally located monitoring device to verify the generation of an accurate regulated negative voltage output. The second output provides a positive voltage when an accurate regulated negative voltage output is generated. The circuit also comprises a means connected to the output of the negative voltage regulator for stabilizing the voltage output of the negative voltage regulator. The regulated negative voltage output provided by the present invention is preferably used as an electrostatic displacement voltage for calibrating the output of a transducer which senses an acceleration profile of a moving object.

The present invention will be more fully understood upon reading the following detailed description of the preferred embodiment in conjunction with the accompanying drawings.

BRIEF DESCRIPTION OF THE DRAWINGS

The FIGURE is a detailed schematic of a regulated negative voltage calibration pulse generating circuit in accordance with the present invention.

DETAILED DESCRIPTION OF THE PREFERRED EMBODIMENTS OF THE INVENTION

A regulated negative voltage calibration pulse generating circuit 10, in accordance with the present invention, is shown in the FIGURE as generating a negative voltage output $V_{out}$ for use in calibrating a transducer (not shown), such as used for sensing the acceleration profile of a moving object, in response to receiving a control pulse ($V_c$) at an input switch device 12. Control pulse ($V_c$) is preferably periodically generated, such as by an externally located microprocessor (not shown). Switch device 12 is implemented as a JFET transistor $Q_1$ having the gate terminal connected to receive the control pulse ($V_c$). The drain terminal of transistor $Q_1$ is connected to both the positive plate of a capacitor $C_1$, and through a resistor $R_2$ to the positive terminal of a positive voltage power supply ($V_{SUPPLY}$), such as a 12 volt battery. The source terminal of transistor $Q_1$ is connected to a ground potential. Resistor $R_1$ provides proper biasing for transistor $Q_1$ with respect to control pulse ($V_c$).

Transistor $Q_1$ provides current switching for controlling the voltage polarity output from a voltage conditioning network 14, as described hereinbelow. Voltage conditioning network 14 comprises resistor $R_2$, capacitor $C_1$, and a diode $D_1$ connected in series between the positive terminal of power supply ($V_{SUPPLY}$) and the ground potential. An output 16 is provided from the negative plate of capacitor $C_1$ for outputing the conditioned voltage ($V_B$).

Conditioned voltage ($V_B$) is supplied as an input to a negative voltage regulator 18. Negative voltage regulator 18 is further supplied with a positive reference voltage ($V_{REF}$), such as the reference excitation voltage of 5 volts used by the transducer to accommodate inherent sensing mass offset not caused by an acceleration force. Conditional voltage ($V_B$) and reference voltage ($V_{REF}$) produce a combined voltage of ($V_B$-$V_{REF}$) across the input of the negative voltage regulator 18. When the combined voltage across the input of the negative voltage regulator 18 is greater than a predetermined negative threshold voltage, negative voltage regulator 18 generates a constant, regulated negative voltage $-(V_{CAL})$, such as $-12$ volts, on an output line 20.

The output line 20 of negative voltage regulator 18 is connected to an output switch device 22. More particularly, output switch device 22 is implemented as a JFET transistor $Q_2$ having the source terminal connected to output line 20, the gate terminal connected to a ground potential, and the drain terminal connected to provide the regulated negative voltage output at output $V_{out}$ when the transistor $Q_2$ is "switched on," as described hereinbelow. A capacitor $C_2$ is further connected to the output line 20 and to a ground potential to stabilize, or smooth, the output of negative voltage regulator 18, thereby removing any perturbations therein.

A calibration voltage bypass network 24 is additionally connected between the positive reference voltage ($V_{REF}$) input and the output $V_{out}$ to provide a positive voltage output on $V_{out}$ when a regulated negative calibration voltage ($-V_{CAL}$) is not being generated by negative voltage regulator 18. This arrangement allows the output $V_{out}$ to provide the desired reference excitation voltage to the transducer when a negative calibration pulse is not being generated. The calibration voltage bypass network 24 comprises a pair of resistors $R_3$ and $R_4$ which are connected in series between the reference voltage ($V_{REF}$) input and the output $V_{out}$. A voltage monitoring line 26 is connected to the calibration voltage bypass network 24 intermediate the pair of resistors $R_3$ and $R_4$. Voltage monitoring line 26 provides a connection to an external voltage monitoring device (not shown) for verifying the generation of a proper regulated negative voltage calibration pulse at output $V_{out}$, which is further described hereinbelow.

In operation, the regulated negative voltage calibration pulse generating circuit 10 periodically receives the externally generated control pulse ($V_c$) on the gate terminal of transistor $Q_1$. It is noted that when no control pulse ($V_c$) is present at the gate terminal of transistor $Q_1$, the capacitor $C_1$ charges to a positive voltage equal to the supply voltage ($V_{SUPPLY}$) minus the voltage drop across diode $D_1$. The values of capacitor $C_1$ and resistor $R_2$ are selected to establish an RC time constant of an appropriate duration to achieve the full positive charging of capacitor $C_1$ between periodic control pulses ($V_c$).

When a control pulse ($V_c$) is placed on the gate terminal of transistor $Q_1$, the transistor $Q_1$ generates an activation potential, i.e., "switches on," which draws the top plate of capacitor $C_1$ down to the ground potential, thus causing the bottom plate to correspondingly swing from a positive voltage charge ($V_B$) to a negative voltage charge ($-V_B$) equal to the supply voltage ($V_{SUPPLY}$) minus the voltage drop across transistor $Q_1$. The reverse in charge polarity on capacitor $C_1$ also switches off current flow through the diode $D_1$, and allows the negative voltage charge on capacitor $C_1$ to discharge through the negative voltage regulator 18 via line 16.

The swing to a negative voltage charge ($-V_B$) on line 16 triggers the negative voltage regulator 18 to generate the constant regulated negative voltage output ($-V_{CAL}$) on line 20. The value of capacitor $C_1$ is selected to ensure the discharge time is sufficient enough to maintain line 16 above the minimum negative voltage threshold of negative voltage regulator 18 for the duration of control pulse ($V_c$). Because the gate terminal of transistor $Q_2$ is tied to ground, transistor $Q_2$ is "switched on" when a negative potential is applied to the source terminal. The switching on of transistor $Q_2$ allows the regulated negative voltage ($-V_{CAL}$) to pass through the drain terminal for output at $V_{out}$.

The cessation of the input control pulse ($V_c$) causes transistor $Q_1$ to "switch off," thereby pulling the negative plate of capacitor $C_1$ up to a positive voltage equal to the voltage drop across diode $D_1$. Capacitor $C_1$ then begins to recharge to a positive voltage equal to the supply voltage ($V_{SUPPLY}$) minus the voltage drop across diode $D_1$. When the voltage potential on line 16 approaches the ground potential, the negative voltage regulator 18 ceases to generate the regulated negative voltage output. Thus, the voltage potential on line 20 will follow the voltage potential on line 16, thereby switching off transistor $Q_2$. The output $V_{out}$ is then switched to the positive reference voltage ($V_{REF}$) by resistor $R_3$ and $R_4$.

Proper operation of the regulated negative calibration pulse generating circuit 10 is verified by connecting an external monitoring device to monitoring line 26. Monitoring line 26 establishes a tap point between resistors $R_3$ and $R_4$, with the ratio between the resistance values of $R_3$ and $R_4$ preferably selected to provide a small, positive voltage on line 26 when a proper regulated negative calibration voltage is generated at output $V_{out}$. Therefore, an external monitoring device having a positive voltage input range, such as an A/D convertor, can be utilized to verify the generation of an accurate negative voltage calibration pulse.

The regulated negative voltage calibration pulse generating circuit 10 of the present invention advantageously utilizes a positive voltage power supply ($V_{SUPPLY}$) to generate the regulated negative voltage calibration pulse. The regulated negative voltage calibration pulse is particularly suited for use as an electrostatic displacement voltage for calibrating transducers, such as used for sensing acceleration profiles of a moving object. The electrostatic displacement voltage simulates application of a predetermined acceleration field on the sensor frame which causes a positive displacement of a cantilevered sensing mass, thereby generating a sensor output signal which is subsequently measured for calibration of the transducer output.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. A circuit for generating a regulated negative voltage pulse for use in calibrating the output of a transducer comprising:

an input switch means responsive to an externally generated control signal for generating an activation potential;

a voltage conditioning means connected to a first positive voltage source and to said input switch means, said voltage conditioning means generating a negative voltage output in response to generation of said activation potential, and a positive voltage output in the absence of said activation potential;

a negative voltage regulator connected to said voltage conditioning means, said negative voltage regulator being responsive to said negative voltage output for generating a regulated negative voltage output having a predetermined magnitude; and an output switch means responsive to said regulated negative voltage output for outputting said regulated negative voltage output as a calibration signal to said transducer.

2. The circuit of claim 1 further comprising a bypass means connected to a second positive voltage source and said output switch means for outputting a positive voltage to said transducer in the absence of said regulated negative voltage output of predetermined magnitude.

3. The circuit of claim 2 wherein said bypass means further provides an output for connection to a monitoring means, said monitoring means verifying the generation of an accurate regulated negative voltage output.

4. The circuit of claim 3 wherein said output for connection to said monitoring means provides a positive voltage output when an accurate regulated negative voltage output is output by said output switch means.

5. The circuit of claim 2 wherein said second positive voltage source provides a positive voltage equal to a transducer excitation voltage.

6. The circuit of claim 1 further comprising a means connected to the output of said negative voltage regulator for stabilizing the voltage output of said negative voltage regulator.

7. The circuit of claim 1 wherein said input switch means comprises a transistor.

8. The circuit of claim 1 wherein said output switch means comprises a transistor.

9. The circuit of claim 1 wherein said transducer senses an acceleration profile of a moving object, and said regulated negative voltage output of predetermined magnitude provides an electrostatic displacement voltage for calibrating the output of said transducer.

* * * * *